UNITED STATES PATENT OFFICE.

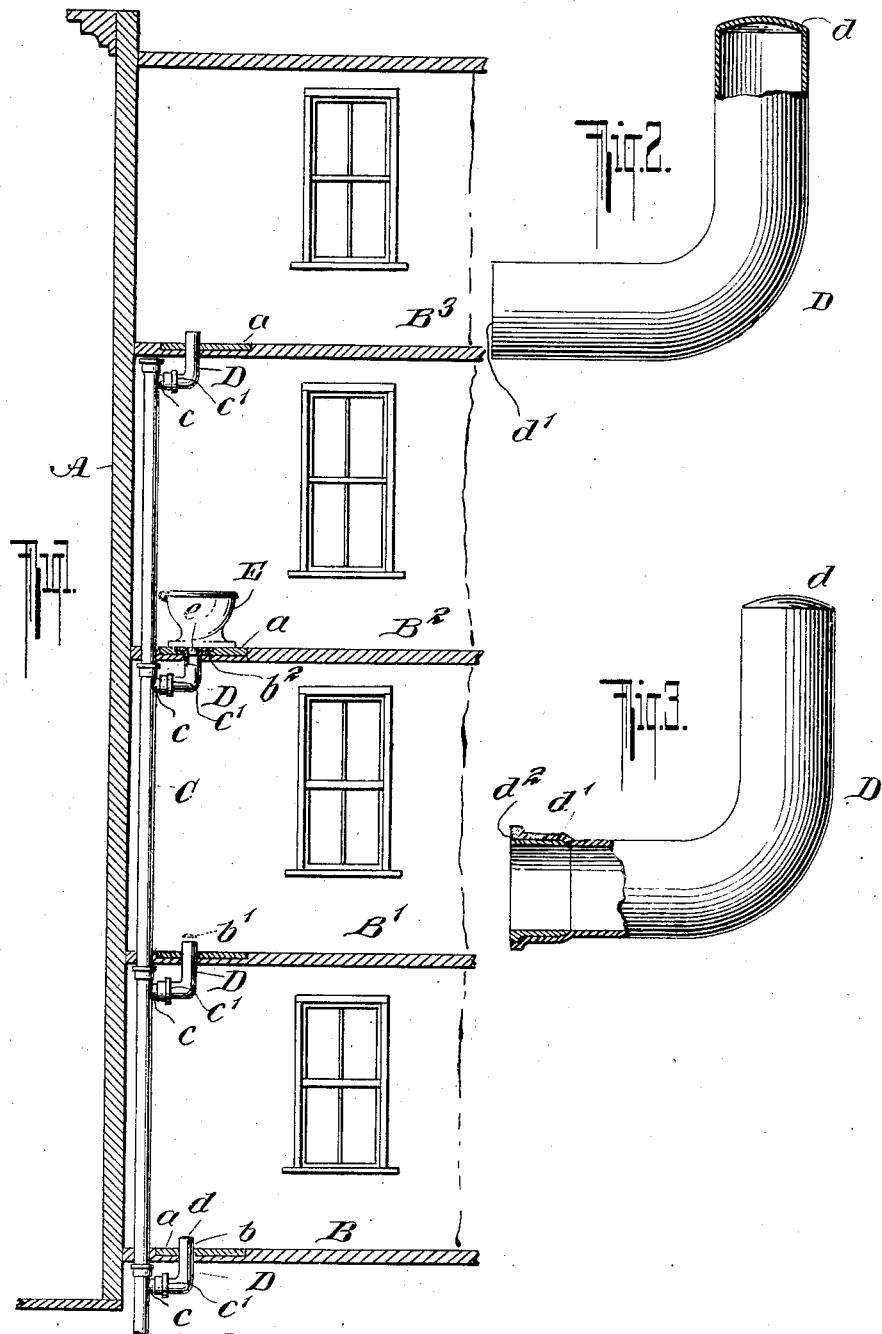

WILLIAM A. FLEMING, OF NEW YORK, N. Y., ASSIGNOR TO F. N. DU BOIS & COMPANY, OF NEW YORK, N. Y., A FIRM.

PIPE FOR CONNECTING WATER-CLOSETS WITH SOIL-PIPES.

No. 918,137.　　　　　Specification of Letters Patent.　　　　Patented April 13, 1909.

Application filed April 12, 1907. Serial No. 367,829.

*To all whom it may concern:*

Be it known that I, WILLIAM A. FLEMING, a citizen of the United States, and a resident of the borough of Manhattan, in the city, county, and State of New York, have invented certain new and useful Improvements in Pipes for Connecting Water-Closets with Soil-Pipes, of which the following is a specification.

In the plumbing of dwellings or other buildings it is the custom, after the soil pipe has been erected, and the pipes connecting the closets and other plumbing apparatus therewith have been secured in place, to test these pipes by water under pressure, with a view to determining as to whether or not there is or are any leak or leaks in them through which the water and sewer gas may escape and enter the building, and this is, in fact, required by the ordinances of the cities of the country generally.

In the plumbing of the building, the pipes intermediate the several closets and other plumbers' fixtures on the one hand, and the soil pipe on the other, are usually made of lead, and, in making the test referred to, it has been necessary before the test was made to close the free ends of the various connecting pipes, by soldering a plate over each, which, after the test has been completed, had to be removed before the flanging of the free ends of the pipes for reception of their respective closets or other fixtures could be accomplished. This method of closing the free ends of the connecting pipes, while satisfactory to a certain degree, involves some considerable time and expense, and, besides, it not infrequently happens that, when the stand or soil pipe is of considerable height, the plates or caps of some of the lower connecting pipes are forced off, in whole or in part, necessitating their replacement or the closure of such leak or leaks as may appear between them and the pipes to which they are soldered.

The object of my invention is therefore to overcome these defects, and to provide a connecting pipe for water closets of the character specified ready at hand, in which the necessity for closing its free open end, when required for testing or other purposes, by soldering a plate over it, is obviated.

To these ends the invention consists, in an angular connecting pipe, which is adapted at one end for securement to a soil pipe, and is, at its other end, closed by spinning over the metal around it until it assumes a dome or segmental spherical form, all as will hereinafter more fully appear.

Referring to the accompanying drawing, which forms a part of this specification, Figure 1, is a sectional elevation taken vertically of a portion of a dwelling house or other building, showing a soil pipe arranged therein, with a water closet, and connecting pipes constructed in accordance with my invention; Fig. 2, is a side elevation, partly in vertical section, of a connecting pipe constructed in accordance with my invention, and Fig. 3, is a similar side elevation thereof, partly in section, of a slightly modified form of construction.

In all the figures, like letters of reference are employed to designate corresponding parts.

A indicates the walls of a dwelling house or other building, and B, B¹, B², and B³, indicate the floors thereof.

C indicates a soil pipe arranged in such building, and, extending upward through the floors thereof, is provided beneath each with a branch pipe $c$ with which is connected an angular pipe D, that likewise extends upward through the floor for connection with a water closet located thereon. These pipes D, to which my invention more particularly relates, are preferably constructed from drawn lead, of the proper angular form in longitudinal section to suit them to the locations in which they are to be employed, with the upper end $d$ of each closed and the lower end $d^6$ thereof open. In the construction of these pipes their body portions, which are of approximately L shape in longitudinal section, are or may be formed by any of the methods usually employed in the formation of plumber's lead traps, after which the upper or free ends of these body portions are closed by spinning the material of the walls thereof inward over the same in the form of a dome or segment of a sphere. As thus constructed, this pipe D is adapted for connection at its lower end $d^1$ with the soil pipe C, by any of the ordinary or well known means usually employed for that purpose. When employed in connection with the branch of a soil pipe that is constructed from wrought iron or steel, the connection of the lower end $d^1$ of this pipe D with the branch $c$ will preferably be made by what is known to the art as a "wipe joint," and, when thus employed, this lower open end $d^1$ will be unprovided with any strengthening ferrule or other reinforcing means, as shown in Fig. 2. When, on the other hand, this connecting pipe D is employed in connection with a soil pipe and branch that are constructed of cast iron, then its open lower end $d^1$ will preferably be secured in the socket $c^1$ of the branch $c$, by being inserted therein, and then surrounded within the socket with a string of oakum and molten lead, which latter is afterward compacted therein, forming what is called in the art a "calked joint;" and, when thus employed, this lower open end $d^1$ may be provided with a reinforcing ferrule or sleeve $d^2$, which will be secured thereto by spinning or otherwise, as shown in Fig. 3. With the soil pipe thus provided with these connecting pipes D, at the points where required, these connecting pipes will project upward through the floors that carry the water closets with which they are to be respectively connected, with their upper ends closed, as shown at $b$ in Fig. 1. As thus constructed and arranged the testing of these and of the soil pipe, to determine whether they and it are free from any leak or leaks will be made by filling both the connecting and soil pipes with a column of water, which may be supplemented by pressure if so desired. If free from any leak or leaks, the water may then be withdrawn, and the upper closed end $d$ of the connecting pipe prepared to receive the closet that is to be connected with it. If, on the other hand, any leak appears in the pipe, then, after it has been closed, the same preparation of the upper end of the connecting pipes will be made. For preparing the upper closed end of each of these connecting pipes D for reception of the water closet the upper closed end $d$ will be removed by severing it from the remainder of the pipe, by sawing or otherwise, as shown at $b^1$ in Fig. 1. With the closed end $d$ thus removed, the portion of the pipe projecting upward beyond the floor will be outwardly flanged, as shown at $b^2$, when its open end will then receive the downwardly extending nipple $e$ on the bottom of the water closet E.

In some instances the water closet E, when employed, may rest directly upon the top of the floor, without any intervening slab or other support. I prefer however to support the closet upon a marble or other appropriate slab, which will or may be let into the floor so as to be flush with it, as shown at $a$. With the connecting pipe D thus constructed with the over-spun closed upper end, as above described, the necessity of applying thereto a plate or cap by soldering or otherwise when a test of the pipes is to be made, as well as the consequent danger of leaking and of being detached, are obviated, and a connecting pipe produced ready to hand, in which its upper end is closed, and all danger of rupture at that point when a test is made because of its greatly increased strength removed.

I am aware that it is not new to close the outer ends of the branches of waste pipes at the time of casting the pipes, by casting a thin web or plate of the same material as the pipe over them, as the same is respectively shown in the U. S. Patent No. 427,478, of May 6th, 1890, and in Figs. 47 and 48 of "House drainage and sanitary fitments" by Jansen, published by The Sanitary Publishing Company, Limited, London, in 1900. I am also aware that it is not new to employ open ended S shape lead traps for connecting water closet bowls or hopper with the upper ends of soil pipes; as I am, likewise aware that the employment of other shaped open ended lead traps for connecting water closet bowls or hoppers with the branches of soil pipes is not new, but that the same are respectively shown in U. S. Patents Nos. 299,605, of June 3rd, 1884, and 597,497, of January 18th, 1898. These I do not claim, but Having described my invention, what I do claim and desire to secure by Letters Patent of the United States is—

1. As an article of manufacture, a connecting pipe for connecting a water closet with a branch of a soil pipe constructed of ductile material that is capable of being spun and distended and of an angular shape in longitudinal section with an over-spun closed upper end, as and for the purposes specified.

2. The combination, with a soil pipe provided with a branch pipe, of a connecting pipe for connecting a water closet with such branch pipe constructed of ductile material that is capable of being spun and distended and also constructed of an angular shape in longitudinal section with an over-spun closed upper end and fixedly secured at its lower end in such branch pipe, substantially as described.

In witness whereof I have hereunto set my hand this 8th day of April, 1907.

WILLIAM A. FLEMING.

Witnesses:
ROBERT A. McCLENAHAN,
SILAS KETCHAM.